May 1, 1962 A. J. SORCHY 3,032,667
MOTOR BRAKE
Filed April 3, 1958
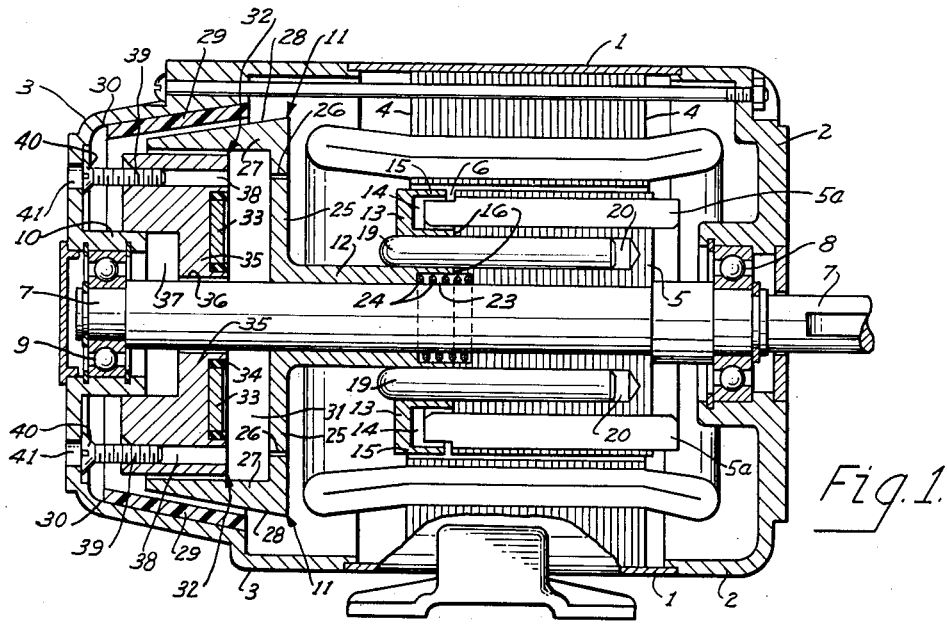
Fig. 1.
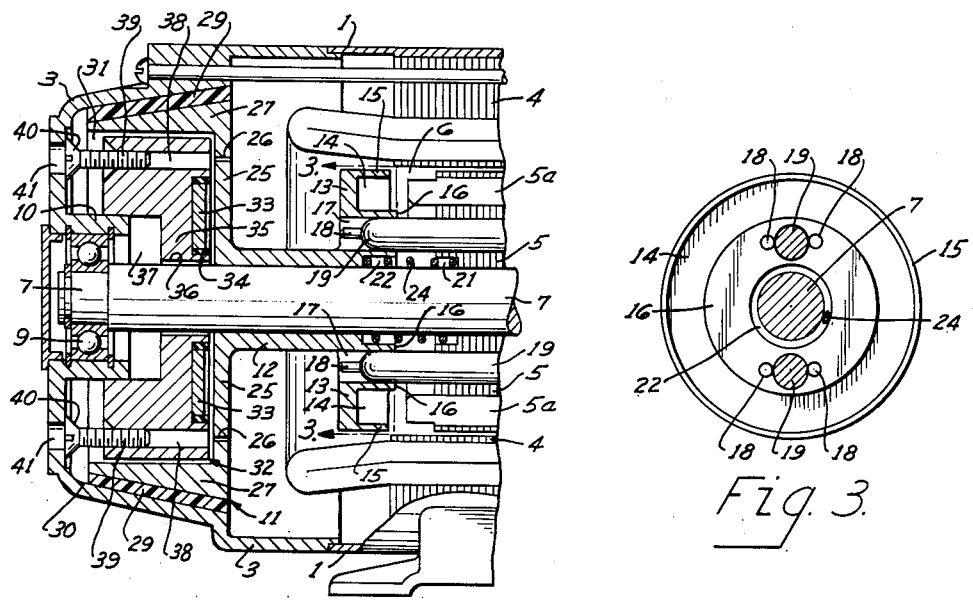
Fig. 2.
Fig. 3.
INVENTOR.
ANTHONY J. SORCHY
BY
ATTORNEYS.

United States Patent Office 3,032,667
Patented May 1, 1962

3,032,667
MOTOR BRAKE
Anthony J. Sorchy, Cleveland, Ohio, assignor, by mesne assignments, to Manning, Maxwell & Moore, Inc., Muskegon, Mich., a corporation of New Jersey
Filed Apr. 3, 1958, Ser. No. 726,120
4 Claims. (Cl. 310—77)

This invention relates to a fast-acting brake for a dynamo-electric machine such as a motor.

There are many installations that require a motor brake characterized by gradual acceleration and deceleration of the motor, an example being motor-driven trolleys of the types commonly used in mechanical handling systems. For these purposes, known motor brakes are satisfactory. On the other hand, there are circumstances in which gradual acceleration and deceleration are not particularly well suited to the needs of the installation, as when a trolley incorporating an electric motor must operate on an incline. Also, in electrically-powered hoists operating directly on heavy loads that are to be raised or lowered, gradual acceleration and deceleration are not usually of advantage. Under such circumstances, a fast-acting brake is a desideratum.

The present invention, which is an improvement on that of United States Patent 2,802,121, has for one of its objects the provision of a simple, sturdy brake for a motor or other form of dynamo-electric machine intended to operate under conditions in which rapid acceleration and deceleration of the machine are desirable. To this end, a brake is provided in which the movable brake element is moved out of brake-set position immediately upon energization of the machine and in which, upon de-energization of the machine, it is moved almost instantly into brake-set position. The movable brake elements are held firmly in brake-set position as long as the machine is de-energized. Movement into and out of the brake-set position is prompt, sure and effective, regardless of whether the movement is in brake-setting or in brake-releasing direction.

The invention further has for one of its objects a material reduction in the over-all length of the machine, thus permitting of its use in circumstances in which a longer machine might be ruled out. To this end, the invention contemplates the telescoping of certain of the major components of the machine, some of them movable and some of them non-movable, in a manner to be explained hereinafter. By doing so, it becomes feasible to eliminate the housing extension used in the motor shown and described in United States Patent 2,802,121. In place of such extension, the present invention provides an especially designed end piece which not only is capable of performing all of the functions of the usual end bell but which includes and incorporates the stationary brake elements.

In the hereinafter described embodiment of the invention, the dynamo-electric machine takes the form of a motor provided with a suitable supporting structure including a housing and two end pieces of the nature of end bells. Within the housing are a rotatably supported shaft; a rotor on the shaft; a stator surrounding the rotor in which stator the windings overhang the rotor in such manner as to form a chamber adjacent one of the two ends of the rotor; a skeletal plunger slidably mounted on the shaft for movement into and out of a retracted position in which the plunger is disposed within the chamber formed by the stator windings; and a magnet assembly mounted in and supported from one of the end bells in apposition to the outer end of the plunger. Preferably, the magnet assembly is so mounted and supported that it can be adjusted axially of the end bell without necessitating removal of the end bell from the motor.

Other objects, advantages and features of the invention will be apparent from the description which follows and from the accompanying drawings, in which:

FIGURE 1 is a central vertical section through the motor showing the brake with its movable parts in the brake-released position.

FIGURE 2 is a similar section showing the brake with its movable parts in the brake-set position.

FIGURE 3 is a section on line 3—3 of FIGURE 2.

In the drawings, FIGURES 1 and 2 show the invention as applied to an electric motor of the squirrel cage type. Housing 1, which is equipped with bell-shaped end pieces 2 and 3, encloses stator 4 and rotor 5. At its left hand end, seen as in FIGURES 1 and 2, stator 4 overhangs rotor 5 so as to form an annular chamber 6. Core piece 5a, built up of metal conductor bars, projects outwardly into chamber 6 from the laminations that go to make up rotor 5: see FIGURE 2. Shaft 7, which mounts rotor 5, is supported at its ends by ball bearing assemblies 8 and 9. Inwardly projecting flanges such as annular flange 10 may be used to hold the ball bearing assemblies in place in the end bells.

Chamber 6, which is circular in shape, is adapted to receive the proximate end of a skeletal plunger 11 that is preferably formed as shown of cast malleable iron. It may, however, be built up or, if desired, machined from solid stock. If so, it may be of any of the metals conventionally used in plungers for solenoids. It is so proportioned that its inner end, which is considerably smaller in diameter than its outer end, can move into and out of chamber 6 without interfering with stator 4. The tubular middle portion 12 of plunger 11 is slidable on the surface of shaft 7, a clearance of a few thousandths of an inch intervening between them.

At its inner end, tubular middle portion 12 of plunger 11 carries a rather wide flange 13 which extends radially to the longitudinal axis of the plunger. This flange is wide enough, measured from front to rear, to permit of the presence of the annular hollow 14, best seen in FIGURE 2, which is provided in order that flange 13 may receive the projecting outer end of core piece 5a when the parts are in brake-released position: see FIGURE 1. The outer walls of hollow 14 are formed by an inwardly directed circular collar 15: the latter is not co-extensive with but falls short of the full width of flange 13. Rear face 16 of flange 13 functions as a stop for the plunger as a whole by abutting the stack of laminae making up rotor 5.

As appears from FIGURE 2, flange 13 is provided with two bores 17 located diametrically opposite each other. These bores, each of which is flanked by two dowel pins 18 of hardened metal in the side walls of the bore, receive the outer ends of two steel drive pins 19 by means of which plunger 11 is caused to turn with rotor 5. Dowel pins 18 are inserted and held in place in lesser bores immediately adjoining bores 17. They are provided for the purpose of preventing possible distortion of the metal of flange 13 with the resulting development of non-circular cross sections where the side walls of bores 17 are engaged by drive pins 19. The latter are cemented in place in or driven into cylindrical openings 20 in rotor 5: see FIGURE 1.

The end of rotor 5 is provided with a cut-away portion 21 immediately adjoining shaft 7. A similar cut-away portion 22 is formed in plunger 11 at the inner end of tubular portion 12. When the parts are in brake-released position; i.e., when stop 16 abuts rotor 5, cut-away portions 21 and 22 form a pocket 23 for spring 24: see FIGURE 1. Spring 24 is a helical spring installed under compression, thus tending to bias plunger 11 toward the left, seen as in FIGURES 1 and 2.

At its outer end, tubular portion 12 of plunger 11 carries a radially directed outer flange 26 which is narrower but of considerably greater over all diameter than inner flange 13. Flange 26 is itself provided with an outwardly directed collar portion 27 which, on its periphery, carries a frusto-conical braking surface 28. The latter tapers toward its outer end; accordingly, collar 27 is somewhat thicker where it impinges on flange 26 than it is at its outer or leading end. In order to provide the maximum area for braking surface 28, the minimum diameter of collar 27 is considerably greater than the maximum diameter of flange 13.

On the inside of end bell 3 is a complementary frusto-conical surface to which is cemented a brake lining 29 formed of conventional brake lining material. Preferably lining 29 consists of four generally trapezoidal segments that are disposed in reversed relation to each other. They are cemented in place on frusto-conical surface 30 by means of a suitable commercial adhesive so that, when worn, they may readily be replaced. Whereas braking surface 28 on plunger 11 constitutes the movable brake element, either brake lining 29 or frusto-conical surface 30 or both may be regarded as the stationary brake element.

Formed as just described, plunger 11 has a large outwardly facing hollow 31 which, in the preferred embodiment of the invention, is used to cause plunger 11 to telescope with a stationary magnet assembly 32 that is mounted in and supported from end bell 3. Magnet assembly 32 consists of a ceramic magnet 33 held in place by an insulating jacket 34 in a suitable opening in the inner end of an annular retainer 35 of ferromagnetic metal. The latter, being stationary, has to be spaced from the outer surface of shaft 7 by a suitable clearance 36. A commercial epoxy resin that can be polymerized in situ by means of a liquid catalyst may be used to form the insulating jacket 34 by which magnet 33 is held in place.

A suitable ceramic magnet is supplied by Indiana Steel Products Company, Valparaiso, Indiana, under the trademark "Indox V." It is described as a permanent magnet made of highly oriented barium ferrite ($BaFe_{12}O_{19}$). In relation to the area of the material, such magnets are extraordinarily powerful; accordingly, they can be quite shallow. On the other hand, being somewhat brittle, they are more readily damaged than other magnetic compositions and therefore have to be protected against impact. For this reason, ceramic magnet 33 is depressed or offset slightly in an outward direction from the general plane of the surface of retainer 35.

After magnet 33 has been incorporated in retainer 35, magnet assembly 32 is magnetized by exposing it to a strong magnetic field. In consequence thereof, magnet 33 becomes one of the two poles of the assembly as a whole. Retainer 35 becomes the other pole. Thus when the magnet assembly is mounted on flange 10, it exerts a high degree of magnetic attraction on plunger 11. With the parts in the brake-set position shown in FIGURE 2, the magnetic force so produced, abetted by spring 24, serves to hold the movable and stationary brake elements in particularly firm engagement with each other.

From a comparison of FIGURES 1 and 2 it will be apparent in what manner plunger 11 telescopes with magnet assembly 32. When the parts are in the brake-set position, magnet assembly 32 is entirely received within the hollow 31 in the outer end of plunger 11. In order to save space, retainer 35 is itself recessed at 37, where it in turn receives the internal flange 10 on end bell 3 within which ball bearing assembly 9 is located. The cylindrical surface surrounding hollow 37 in retainer 35 and the cylindrical surface of flange 10 are machined to a degree sufficient to permit retainer 35 to slide freely over flange 10. This arrangement allows for telescoping of these components, as is desirable in any event but particularly desirable if magnet assembly 32 is to be axially adjustable in relation to shaft 7.

Adjustment of retainer 35 is made possible by providing it with tapped openings 38 for a plurality of internal adjusting screws 39. Each such screw carries a slotted head 40 to which access is had through an access opening 41 in the end face of end bell 3. Magnet assembly 32 is not held in place by internal screws 39, but by a plurality of external screws (not shown) that are spaced from internal screws 39 by suitable angular distances, i.e., 90°. This arrangement makes it possible to adjust the position of magnet assembly 32 from the exterior of end bell 3 by inserting the end of a screw driver through the access openings.

Assuming the parts to be in brake-set position, a powerful electrical field is developed within stator 4 upon energization of the motor. That portion of the stator which overhangs rotor 5 to form chamber 6 exerts a strong attraction for plunger 11, which, as noted, is slidably mounted on shaft 7. The attractive force is particularly strong at the outset; i.e., during the period when rotor 5 and shaft 7 first begin to turn. As the attractive force develops, it pulls plunger 11 out of brake-set position, notwithstanding the biasing action of spring 24 and the magnetic forces exerted on the plunger by magnet assembly 32. Despite the large overall mass of the plunger, the action is so prompt as to result in virtually immediate movement of the plunger into the brake-released position.

After the motor is once running under full load, the attractive force diminishes considerably; however, it remains effective insofar as concerns the plunger, which continues to be attracted by it. Thereafter, so long as motor is in operation, the force exerted by spring 24 on plunger 11 is not sufficient to urge the plunger into brake-set position in opposition to the attractive force so developed by stator 4. Even though reduced in magnitude, the latter force continues to dominate. When the motor is de-energized, the attractive force exerted by stator 4 disappears, whereupon spring 24 initiates return movement of the plunger toward the brake-set position.

As this movement develops, the outer end of plunger 11 moves closer to magnet assembly 32. The mutual attraction between them soon makes itself felt, resulting in rapidly accelerated movement of the plunger into brake-set position. As a result, the brake-setting action, like the brake-releasing action, is characterized by a prompt response on the part of the plunger, this notwithstanding the fact that the plunger is of course subject to the operation of ordinary inertia forces.

Thus the invention provides a brake for a dynamo-electric machine such as a motor which is simple, sturdy and virtually foolproof. Being easily manufactured, the parts are relatively inexpensive. The cost of assembling them is not excessive. The action of the brake is unusual because of the rapid response of the plunger to the needs of the situation, whether the movement is from brake-set into brake-released position or vice versa. Because the brake-setting action is so prompt, a motor under full load can be brought to a complete halt in a matter of a few seconds.

In addition to having the foregoing advantages, the dynamo-electric machine of the present invention has the important advantage of being relatively short in overall length, having in mind the fact that it includes stationary and movable brake elements, a magnet assembly, and means for adjusting the magnet assembly within the housing. This is made possible by telescoping the magnet assembly on the supporting flange, by telescoping the outer end of the plunger in relation to the magnet assembly, and by telescoping the inner end of the plunger in relation to the core piece that forms part of the rotor.

Notwithstanding the fact that the plunger is longer from end to end that the rotor itself, the added length attributable to the presence in the machine of the magnetic brake of the present invention is relatively small. As compared with prior dynamo-electric machines incorporating magnetic brakes, more particularly brakes making use of permanent magnets, a considerable reduction in the over-all length of the machine is achieved. This is an important practical advantage when it comes to installing the motor under conditions where space is at a premium.

It is evident that changes may be made by those skilled in the art without departing from the spirit of the invention. Thus the plunger may take different form or, if desired, may be coupled in different fashion to the rotor. The magnet assembly may be differently formed and/or differently located; for example, it may consist of a plurality of individual magnets spaced from each other at equal angular distances about a common axis. Different means for adjusting its position may be provided, if desired. Other changes can be expected to suggest themselves to those versed in the art to which the invention relates.

It is intended that the patent shall cover, by summarization in appended claims, all features of patentable novelty residing in the invention.

What is claimed is:

1. In a dynamo-electric machine, a supporting structure comprising a housing and opposed end bell covers; a stator, a rotor and a shaft in said rotor carried by said supporting structure; fixed braking means on one of said covers, movable braking means in the form of a plunger slidable on said shaft with an outwardly directed collar at its outer end to cooperate with said fixed braking means; an inwardly extending annular flange on said one cover; a magnet assembly slidable on said flange and disposed within said collar to urge said plunger toward braking position with the collar engaging said fixed braking means; and adjusting means accessible through said one cover to vary the position of said magnet assembly to effect adjustment of said braking means without removing said one cover.

2. In a dynamo-electric machine, a supporting structure comprising a housing and opposed end bell covers; a stator, a rotor and a shaft in said rotor carried by said supporting structure; fixed braking means on one of said covers, movable braking means in the form of a plunger slidable on said shaft with an outwardly directed collar at its outer end to cooperate with said fixed braking means; an annular flange on the inner end of said plunger having a plurality of apertures therein; drive pins fixed in said rotor and extending into said apertures to cause said plunger to rotate with said rotor and shaft; and a magnet assembly adjacent the said one cover urging said plunger toward said fixed braking means.

3. In a dynamo-electric machine, a supporting structure comprising a housing and opposed end bell covers; a stator, a rotor and a shaft in said rotor carried by said supporting structure; fixed braking means on one of said covers, movable braking means in the form of a plunger slidable on said shaft with an outwardly directed collar at its outer end to cooperate with said fixed braking means; a magnet assembly adjacent said one cover inside said plunger collar whereby said collar telescopes over the assembly; and an annular flange on the inner end of said plunger having a hollow therein to telescope over a portion of said rotor when the machine is energized.

4. A dynamo-electric machine according to claim 3 in which driving means carried by said rotor engage said plunger flange to cause rotation of the plunger with the rotor and shaft.

References Cited in the file of this patent

UNITED STATES PATENTS

| 2,480,291 | Gerentes | Aug. 30, 1949 |
| 2,722,617 | Cluwen et al. | Nov. 1, 1955 |
| 2,802,121 | Sorchy | Aug. 6, 1957 |

FOREIGN PATENTS

| 704,914 | Great Britain | Mar. 3, 1954 |